Nov. 20, 1962 G. DONATO 3,064,625
FOUNTAIN PEN
Filed Jan. 16, 1961 2 Sheets-Sheet 1
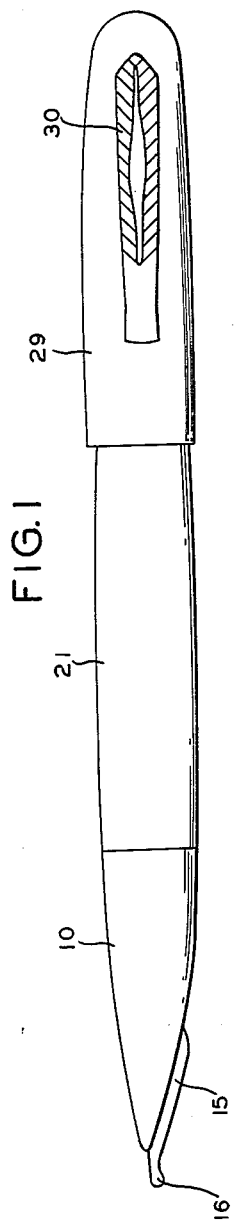
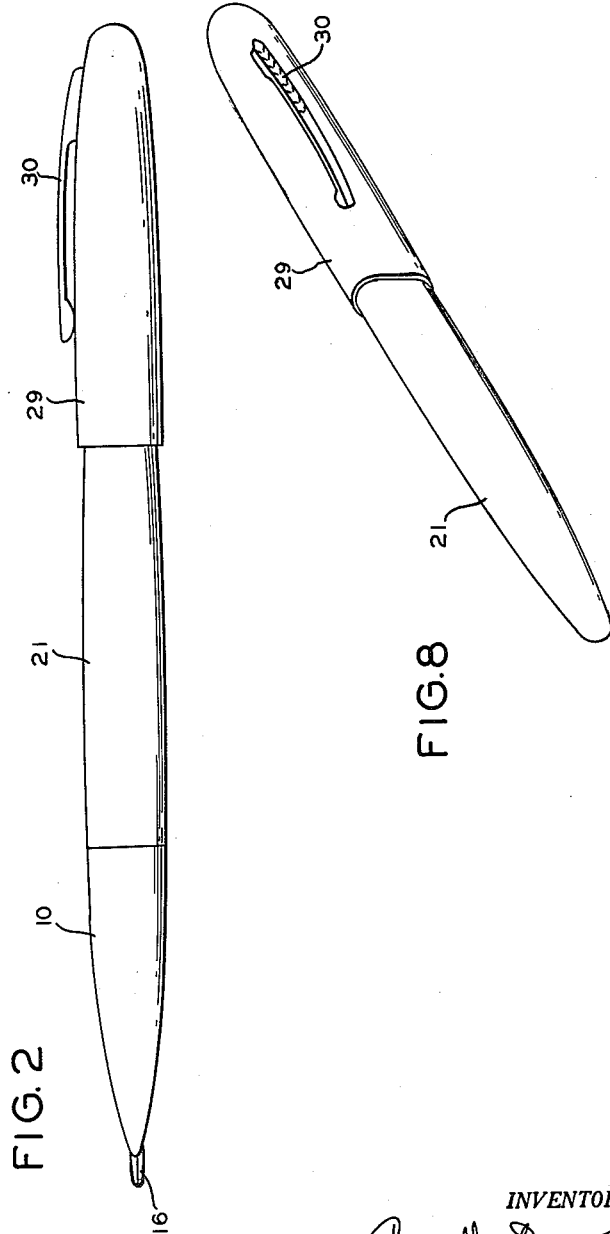
INVENTOR.
BY Giuseppe Donato Nov. 20, 1962  G. DONATO  3,064,625
FOUNTAIN PEN
Filed Jan. 16, 1961  2 Sheets-Sheet 2
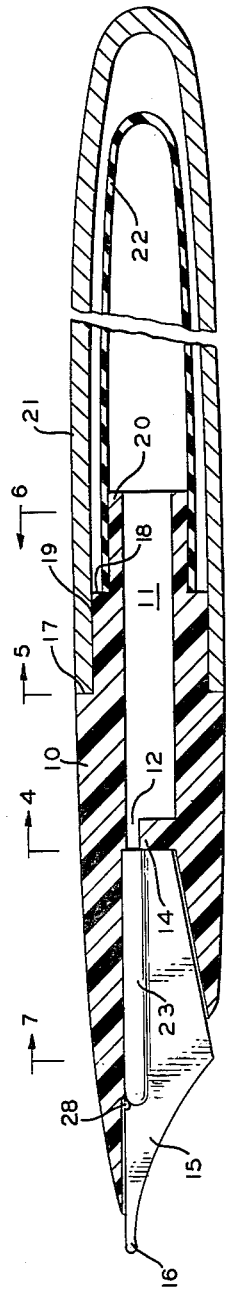
INVENTOR.
Giuseppe Donato
BY United States Patent Office 3,064,625
Patented Nov. 20, 1962

3,064,625
FOUNTAIN PEN
Giuseppe Donato, 717 De Lancey St., Philadelphia 6, Pa.
Filed Jan. 16, 1961, Ser. No. 82,742
6 Claims. (Cl. 120—51)

This invention relates to fountain pens and particularly to a fountain pen having a forward compartment or socket for receiving a shaped pen point.

In the fountain pen art it has heretofore been proposed to provide various rounded structures for holding the pen point and the ink. This has resulted in a pen body which is round with a taper toward the point. As a consequence of this body shape the pen is not the best shape for its primary function, namely, writing, moreover, the round shape makes the pen inherently unstable when put down on an inclined surface.

One object of the present invention is to provide a fountain pen which is fitted to the human hand by having a top to bottom dimension greater than its side to side dimension when in the writing position.

A further object of the present invention is to provide a fountain pen which has roll stability when placed on an inclined surface.

A still further object is to provide a fountain pen having a pen point shaped so that it has a relatively thin cross-wise dimension.

The objects set forth above, and others, are attained through the combination of elements comprising the present invention which is illustrated in a preferred embodiment in the drawings forming a part of this application. It is to be understood that the drawings and description have reference to a preferred embodiment and preferred alternatives.

In the drawings:

FIGURE 1 is a side elevation of the assembled fountain pen of the present invention.

FIGURE 2 is a plan view of the fountain pen of FIGURE 1.

FIGURE 3 is an enlarged transverse section, partly broken away of the pen of FIGURE 1.

FIGURE 4 is a cross section enlarged of the pen of FIGURE 1 taken as indicated in the lines 4—4 on FIGURE 3.

FIGURE 5 is a cross section enlarged of the pen of FIGURE 1 taken as indicated by the lines 5—5 on FIGURE 3.

FIGURE 6 is a cross section enlarged of the pen of FIGURE 1 taken as indicated by the lines 6—6 on FIG. 3.

FIGURE 7 is a cross section enlarged of the pen of FIGURE 1 taken as indicated by the lines 7—7 on FIGURE 3.

FIGURE 8 is a perspective view of the pen point of FIGURE 1.

FIGURE 9 is a side elevation of the pen point of FIGURE 8.

FIGURE 10 is a cross section taken as indicated by the lines 10—10 on FIGURE 9.

FIGURE 11 is a cross section taken as indicated by the lines 11—11 on FIGURE 9.

FIGURE 12 is a plan view of the pen point of FIGURE 9.

FIGURE 13 is a side elevation of an alternative form of pen point.

FIGURE 14 is a plan view of the pen point of FIGURE 13.

FIGURE 15 is a side elevation of a third form of pen point.

The fountain pen shown in the drawings consists of a body 10 having a cylindrical bore 11 formed centrally along the longitudinal axis and terminating at its forward end in a bore 12 of substantially smaller diameter. At the forward end of the body 10 there is a socket 13 shaped as shown in FIGURE 7 and open at its forward end. The rearward end of the socket 13 terminates at the shoulder 14. Within the socket 13 there is positioned a removable pen point 15 having a nib 16.

The rearward end of the body 10 terminates in a double stepped down portion forming the shoulders 17 and 18 and the steps 19 and 20. On step 19 the barrel 21 is mounted and is seated against shoulder 17. On step 20 the sack 22 is mounted.

As shown in FIGURE 3 the pen point 15 has along the rear half of its upper portion a channel 23 having a diameter corresponding to that of the bore 12. The channel 23 is in open communication with the capillary space formed between the extensions 25 of the pen point 15. On insertion into the socket 13 the rear edges of the extensions 25 contact the body 10 and the opening of channel 23 is brought into alignment with and in direct liquid communication with the bore 12.

In FIGURES 13 and 14 the pen point is provided with an ink control extension 26 which is positioned to extend through the bore 12 into the bore 11 when the pen point is inserted into the socket 13.

In FIGURE 15 the capillary walls of the pen point are provided with breaks 27 which assist the ink feed action. In all of the pen point embodiments there are breather openings 28.

As shown in FIGURES 1 and 2 a cap 29 is provided having a clasp 30.

The operation of the pen of the present invention is as follows: A supply of ink is first drawn into the sack 22 through the channel 23 and the bores 12 and 11. The ink now occupies not only the sack 22 but also the bores 11 and 12 and the channel 23. The capillary space 24 is thus supplied continuously with ink which is thus free to flow at the nib 16 whenever the pen is used.

In the appended claims I have defined the present invention it being intended that such claims cover not only the preferred embodiments shown and described but also any equivalent structures.

Having described my invention, I claim:

1. In a fountain pen, a body having a bore extending therein and terminating forwardly in a substantially smaller bore, a pen receiving socket positioned in said body forward of the smaller bore and in open communication therewith, a pen point positioned in said socket, said pen point being of split tubular construction separated at the under side thereof to define a channel formed therein and in open communication with said smaller bore when the pen point is positioned in said socket, said pen point being further provided with walls extending outwardly from said separation defining therebetween a capillary ink feed path, and an ink reservoir operatively connected to the body.

2. The fountain pen of claim 1 further characterized by the fact that said body has a top to bottom dimension substantially greater than its dimension from side to side.

3. The invention of claim 1 further characterized by the fact that the pen point is removable from the socket.

4. The invention of claim 1 further characterized by an extension affixed to the pen point and positioned to penetrate into the larger bore through the smaller bore when the pen point is positioned in the socket.

5. The invention of claim 1 in which the said walls are provided with breaks.

6. The invention of claim 1 further characterized by the fact that the pen receiving socket conforms substantially to the outer surfaces of the inserted portion of the pen point.

References Cited in the file of this patent

UNITED STATES PATENTS

| | | |
|---|---|---|
| 659,989 | Salisbury | Oct. 16, 1900 |
| 2,684,052 | Rickmeyer | July 20, 1954 |
| 2,937,618 | Ribas | May 24, 1960 |

FOREIGN PATENTS

| | | |
|---|---|---|
| 82,799 | Switzerland | Mar. 16, 1920 |